G. W. VINAL AND H. D. HOLLER.
DRY CELL.
APPLICATION FILED JAN. 22, 1919.
1,406,429. Patented Feb. 14, 1922.
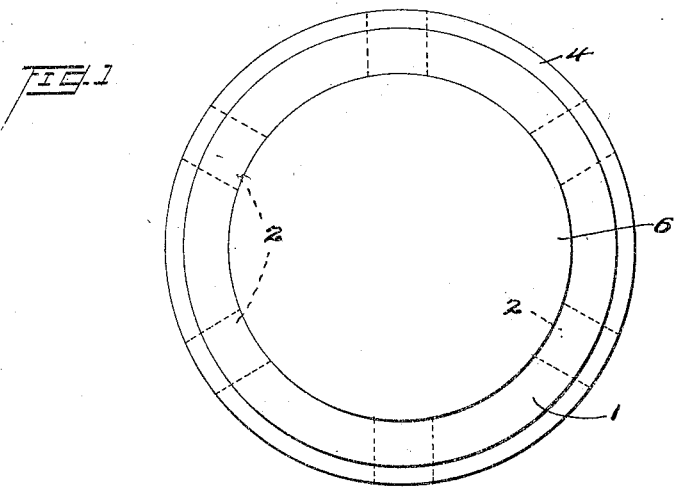
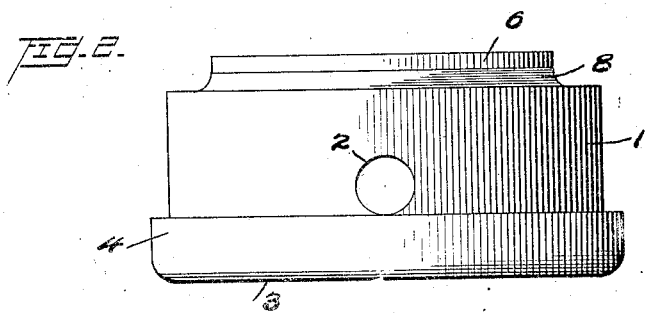
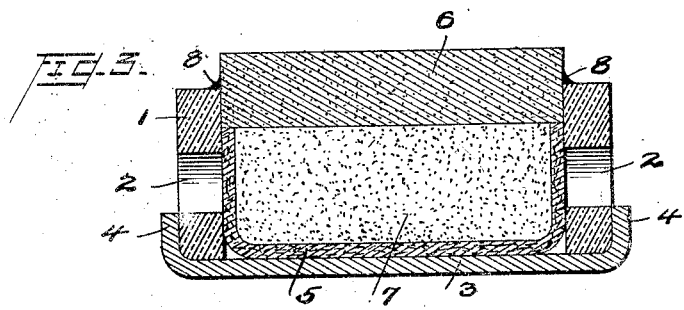
Inventors
George W. Vinal
Homer D. Holler
By
Attorney

UNITED STATES PATENT OFFICE.

GEORGE W. VINAL AND HOMER D. HOLLER, OF WASHINGTON, DISTRICT OF COLUMBIA.

DRY CELL.

1,406,429.   Specification of Letters Patent.   Patented Feb. 14, 1922.

Application filed January 22, 1919. Serial No. 272,454.

*To all whom it may concern:*

Be it known that we, GEORGE W. VINAL and HOMER D. HOLLER, citizens of the United States, residing at Washington, in the District of Columbia, have invented a certain new and Improved Dry Cell, of which the following is a specification.

My invention relates to dry cells and in particular to a type of dry cell which may be kept in a dry condition as long as desired and then moistened to become active. The object of my invention is to provide an improved cell of this type and also to provide a cell of extreme simplicity and durability which is very rugged in construction and will withstand rough treatment without damage. In the drawings, Figure 1 represents a top plan view of the cell which I have devised for this purpose, Figure 2 represents a side view of the cell, while Figure 3 represents a vertical central section.

Referring to the drawing for a more detailed description of my cell, I provide a ring 1 of fibre or other insulating material having a plurality of holes 2. Capping one end of this tube 1 is a zinc plate 3 having its edges upturned as at 4 to encircle and embrace that end of the tube. Placed within the tube is a cup 5 of porous absorbing material so formed as to cover the zinc at the bottom of the tube and also to line the walls of the tube to a point near the top thereof. Inserted in the tube above the cup 5 is a plug 6 of carbon. Carried by the cup 5 and absorbed therein is the electrolyte which preferably consists of sal ammoniac. Included in the space between the cup 5 and the carbon plug 6 is the depolarizing mixture 7, preferably consisting of granular carbon and manganese dioxide. The joint between the tube 1 and plug 6 is closed by an asphalt seal 8.

In constructing my cell the electrolyte is applied to the cup 5, which preferably consists of blotting paper, and allowed to dry. The cup 5 is then inserted in the tube 1 and the depolarizing mixture 7 placed within the cup. The carbon plug 6 is then inserted in the tube and pressed down to compress the depolarizing mixture into a compact mass and to insure good contact between the cup 5 and the zinc 3. The asphalt seal is then poured in. My cell remains in this condition until it is to be put into use. At this time the cell is soaked in water to moisten the cup 5 and dissolve the electrolyte absorbed therein.

By maintaining my cell in a dry condition until its use is desired I eliminate all so called local action while the cell is on the shelf and yet through the addition of water by the means which I have provided I secure an electrolyte of equal quality with that which would be secured were the cell manufactured with the electrolyte in solution. By making the zinc element in the form of a cup and the carbon element in the form of a plug I reduce the likelihood of an external body accidentally contacting with both poles of the cell. By using the tube 1 as the structural basis of my cell and securing the electrodes thereto I produce a cell of added strength and of very rugged construction. By making the zinc element 3 and the carbon element 6 of the large cross section and providing them with flat external surfaces I not only increase the capacity of the cell and decrease the internal resistance thereof but I also provide a sufficiently large contact area so that I may rely on the surface or abutting contact between the electrodes of adjacent cells to furnish the connection between these cells and in this way I eliminate all necessity for binding posts, connecting wires, soldering, or other elaborating means of connecting each cell with those adjacent.

I have described above the preferred embodiment of my cell and indicated the features which I deem particularly valuable and advantageous, but I realize that the advantages of my cell are not limited to a carbon-sal ammoniac-zinc cell but may be used with many other types and, accordingly, I do not consider my invention limited to this type cell except as it is so limited in the appended claims. I also consider as part of my invention all changes and modifications which are within the scope of the appended claims.

I claim:

1. A cell embodying a tube of insulating material primarily open at both ends, an electrode capping one end of said tube and exposing a flat surface suitable for abutting electrical contact, an electrode closing the other end of said tube and also exposing a flat surface suitable for abutting electrical contact, an absorbent container for electrolyte between said electrodes, and electrolyte in said container.

2. A cell comprising a tube of insulating material, an electrode capping and closing one end of said tube and exposing a flat surface suitable for making an abutting electrical contact, an electrode plugging and closing the other end of said tube and exposing a flat surface suitable for abutting electrical contact, and electrolyte between said electrodes and within said tube.

3. A cell comprising an electrode exposing a flat surface suitable for abutting electrical contact, a second electrode of lesser area also exposing a flat surface suitable for abutting electrical contact, apertured insulating material securing said electrodes together with said contact surfaces turned out, porous absorbent material covering the inner face of one of said electrodes and containing electrolyte, and a depolarizer between said material and the other electrode.

4. A cell embodying a tube of insulating material primarily open at both ends, a porous electrolyte holding cup and liner fitted into said tube and closing one end thereof, an electrode capping the same end of said tube and exposing a flat surface suitable for abutting electrical contact, an electrode closing the other end of said tube and also exposing a flat surface suitable for abutting electrical contact, and means for admitting moisture to the interior of said tube through the side wall thereof.

5. A cell as in claim 17, the lined electrode being the cap, the cap electrode being zinc, and the plug electrode being carbon.

In testimony whereof we affix our signatures.

GEORGE W. VINAL.
HOMER D. HOLLER